United States Patent [19]

Tenmoku et al.

[11] Patent Number: 5,486,822
[45] Date of Patent: Jan. 23, 1996

[54] OPTIMUM ROUTE DETERMINATION

[75] Inventors: Kenji Tenmoku; Takuya Inoue; Takeo Hashimoto, all of Osaka, Japan

[73] Assignee: Sumitomo Electric Industries, Ltd., Osaka, Japan

[21] Appl. No.: 250,105

[22] Filed: May 26, 1994

Related U.S. Application Data

[63] Continuation of Ser. No. 786,843, Nov. 1, 1991, abandoned.

[30] Foreign Application Priority Data

Nov. 9, 1990 [JP] Japan ................................ 2-305017
Nov. 10, 1990 [JP] Japan ................................ 2-305020

[51] Int. Cl.⁶ .................................................. G08G 1/123
[52] U.S. Cl. ........................ 340/995; 340/990; 364/444; 364/449
[58] Field of Search ............................ 340/988, 990, 340/995, 905; 73/178 R; 364/449, 444

[56] References Cited

U.S. PATENT DOCUMENTS

| | | | |
|---|---|---|---|
| 4,937,753 | 6/1990 | Yamada | 340/995 |
| 4,954,959 | 9/1990 | Moroto et al. | 340/995 |
| 4,984,168 | 1/1991 | Neukrichner et al. | 340/995 |
| 5,031,104 | 7/1991 | Ikeda et al. | 340/995 |
| 5,115,399 | 5/1992 | Nimura et al. | 340/995 |
| 5,170,353 | 12/1992 | Verstraete | 340/995 |
| 5,184,303 | 2/1993 | Link | 340/995 |
| 5,270,937 | 12/1993 | Link et al. | 340/995 |
| 5,272,638 | 12/1993 | Martin et al. | 340/995 |
| 5,285,391 | 2/1994 | Smith, Jr. et al. | 340/995 |

OTHER PUBLICATIONS

"CARGuide–on–Board Computer for Automobile Route Guidance", M. Sugie et al., AFIPS Conference Proceedings, 1984 National Computer Conference, Jul. 9–12, 1984, Las Vegas, Nevada, AFIPS Press.

John Walker, Editor, "Mobile Information Systems", 1990, Artech House, Boston, Chapter 6: D. J. Jeffrey, "Route Guidance and Vehicle Location Systems", pp. 177, 202.

*Primary Examiner*—Brent A. Swarthout
*Attorney, Agent, or Firm*—Lane, Aitken & McCann

[57] ABSTRACT

An optimum route determination apparatus comprises a plurality of specific points selected from a road map on the basis of a fixed criterion, and an optimum route leading to each destination in which one of the specific points is a departure point and which has been calculated in advance. A route memory has a route table in which data of an initial route leading from the one of the specific points to at least the next specific point through which the optimum route passes are stored in correspondence with the each destination and the one of the specific points. An initialization unit is provided for setting a destination, a specific point near to a vehicle's current location, and specific points along the optimum route. An initial route acquisition unit is provided for retrieving the route table to acquire the data of the initial route in accordance with the destination and the specific point set by the initialization unit.

13 Claims, 6 Drawing Sheets

OPTIMUM ROUTE DETERMINATION

This application is a continuation of application Ser. No. 786,843, filed Nov. 1, 1991, now abandoned.

FIELD OF THE INVENTION

The present invention relates to an optimum route determination apparatus which, according to a destination set by a vehicle operator, reads road map data of an area containing a departure point and that destination out of a road map memory and which determines an optimum route leading from the departure point to the destination based on the road map data.

DESCRIPTION OF THE PRIOR ART

There is known a route guidance apparatus that is designed for displaying the location and heading of a vehicle on the picture screen of a display in order to meet the convenience of travel on unfamiliar areas and travel at night. The route guidance apparatus comprises a display, a heading sensor, a distance sensor, a road map memory, and a computer, which are mounted in a vehicle. The route guidance apparatus detects a vehicle location based on the coincidence of the travel distance data inputted from the distance sensor with the road pattern stored in the road map memory, and displays this vehicle location and a destination on the display, together with road map. In this apparatus, a route leading from a departure point to a destination is judged by the vehicle operator.

However, in very recent years, there has been proposed a vehicle navigation system which, according to a destination entered by a vehicle operator, automatically calculates a route from a departure point to that destination and which displays the automatically calculated route on the display before or during travel.

As the above mentioned automatic calculation method of a route leading from a departure point to a destination, there is a so-called "Dijkstra" method (Dirck Von Vliet, "Improved Shortest Path Algorithm for Transportation Network", Transportation Research, Vol. 12, 1978). In this method, a road that is intended for route calculation is divided into a plurality of roads (links) that are interconnected by nodes. A start point is a node or link nearest to a departure point, and an end point is a node or link nearest to a destination. This method assumes a tree of links leading from the start point to the end point and successively adds link costs of all the links constituting the tree to calculate a route which reaches the destination and whose added link costs are smallest. In evaluating the link cost, a travel distance, travel time, whether freeways are used or not, number of turns, probability of travel on major arteries, avoidance of zones where traffic accidents occur frequently, driver's interest and so on are taken into consideration. If route calculation is performed by this method, a route that reaches a destination can be obtained as long as a route leading from a departure point to the destination exists.

However, in the "Dijkstra" method described above, the time required for route calculation depends upon the number of nodes and links. Therefore, this method has its disadvantages in that a substantial time is required until the route calculation is completed, because a great number of nodes and links normally exist between a departure point and a destination.

It is, accordingly, an important object of the present invention to provide an optimum route determination apparatus which makes it possible to obtain an optimum route quickly even if route calculation is not performed, in a case where road map data are read out of a road map memory in accordance with a destination set by a vehicle operator and then a route leading from a departure point to that destination is calculated.

SUMMARY OF THE INVENTION

The foregoing object is accomplished in accordance with the present invention by providing an optimum route determination apparatus comprising a plurality of specific points selected from a road map on the basis of a fixed criterion, an optimum route leading to each destination in which one of the specific points is a departure point and which has been calculated in advance, and a route memory having a route table in which data of an initial route leading from the one of the specific points to at least the next specific point through which the optimum route passes are stored in correspondence with the each destination and the one of the specific points. The optimum route determination apparatus further comprises initialization means for setting a destination, a specific point near to a vehicle's current location and specific points along the optimum route, and initial route acquisition means for retrieving the route table to acquire the data of the initial route in accordance with the destination and the specific point set by the initialization means. When the same initial route is stored with respect to different destinations, the route table of the route memory has stored therein the same initial route in correspondence with an aggregation of the different destinations.

According to the optimum route determination apparatus, if a destination is set by a vehicle operator and a specific point near to a vehicle' current location is set, the initial route acquisition means retrieves the route table, so that an initial route starting from the specific point near to a vehicle' current location can be acquired.

This initial route is a part of an optimum route leading to the destination set by the vehicle operator and leads from the specific point to a vehicle' current location to at least the next specific point through which the optimum route passes. Therefore, the vehicle can be guided from a specific point to the next specific point by displaying the initial route to the vehicle operator.

Next, if the next specific point on the optimum route is set by the initialization means, the initial route acquisition means is able to acquire the next initial route starting from that next specific point which is a part of the optimum route leading to the destination.

Therefore, the next initial route starting from the next specific point can be displayed to the vehicle operator.

In the same way, consecutive initial routes can be displayed to the vehicle operator, and finally the entire optimum route leading to the destination can be displayed. As a consequence, the optimum route leading to the destination is determined without route calculation and within a short period of time.

In addition, with respect to different destinations, the same initial route has been stored in correspondence with an aggregation of the different destinations. Even if destinations are different from one another, there are some cases where a vehicle travels the same initial route if the destinations are located in the same direction. Therefore, if different destinations each have the same initial route, data of a single initial route have been stored with respect to an aggregation of the different destinations in order to save the capacity of a memory.

The above mentioned destination may also be selected from all points constituting the road map data and from several points set with a fixed criterion in accordance with destinations to which a vehicle operator frequently travels.

The above mentioned specific points are preferable to be selected from main points on the road map, but they may also be selected from all points on the road map.

Also, the route table may store not only data of an initial route leading from a specific point to the next specific point but also data of an initial route leading from a specific point to the next but one specific point.

Road map data may comprise combination of nodes and links, and points on the road map may be specified by the links or nodes.

The route table of the route memory may have stored therein data of the initial route, when a distance between the departure point and the destination is longer than a predetermined distance.

In addition, in an optimum route determination apparatus which, according to a destination set by a vehicle operator, reads road map data of an area containing a departure point and that destination out of a road map memory and which determines an optimum route leading from the departure point to the destination based on the road map data, the optimum route determination apparatus according to the present invention comprises a plurality of specific points selected from the road map data on the basis of a fixed criterion, an optimum route from each departure point in which one of the specific points is a destination and which has been calculated in advance, and a route memory having a route table in which data of an end route between the one of the specific points and at least the next specific point through which the optimum route passes are stored in correspondence with each departure point and one of the specific points. The optimum route determination apparatus further comprises initialization means for setting a departure point, a specific point near to a destination of a trip and specific points along the optimum route, and initial route acquisition means for retrieving the route table to acquire the data of the end route in accordance with the departure point and the specific point set by the initialization means. When the same end route is stored with respect to different destinations, the route table of the route memory has stored therein the same end route in correspondence with an aggregation of the different destinations.

In this case, there is only a difference in that the end routes are obtained in succession from the side of the destination. Therefore, by displaying consecutive end routes, an optimum route leading from a destination to a departure point can be obtained. Therefore, in the embodiments of the present invention, a description will be made as to how the initial route is acquired from the departure point side.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 3:
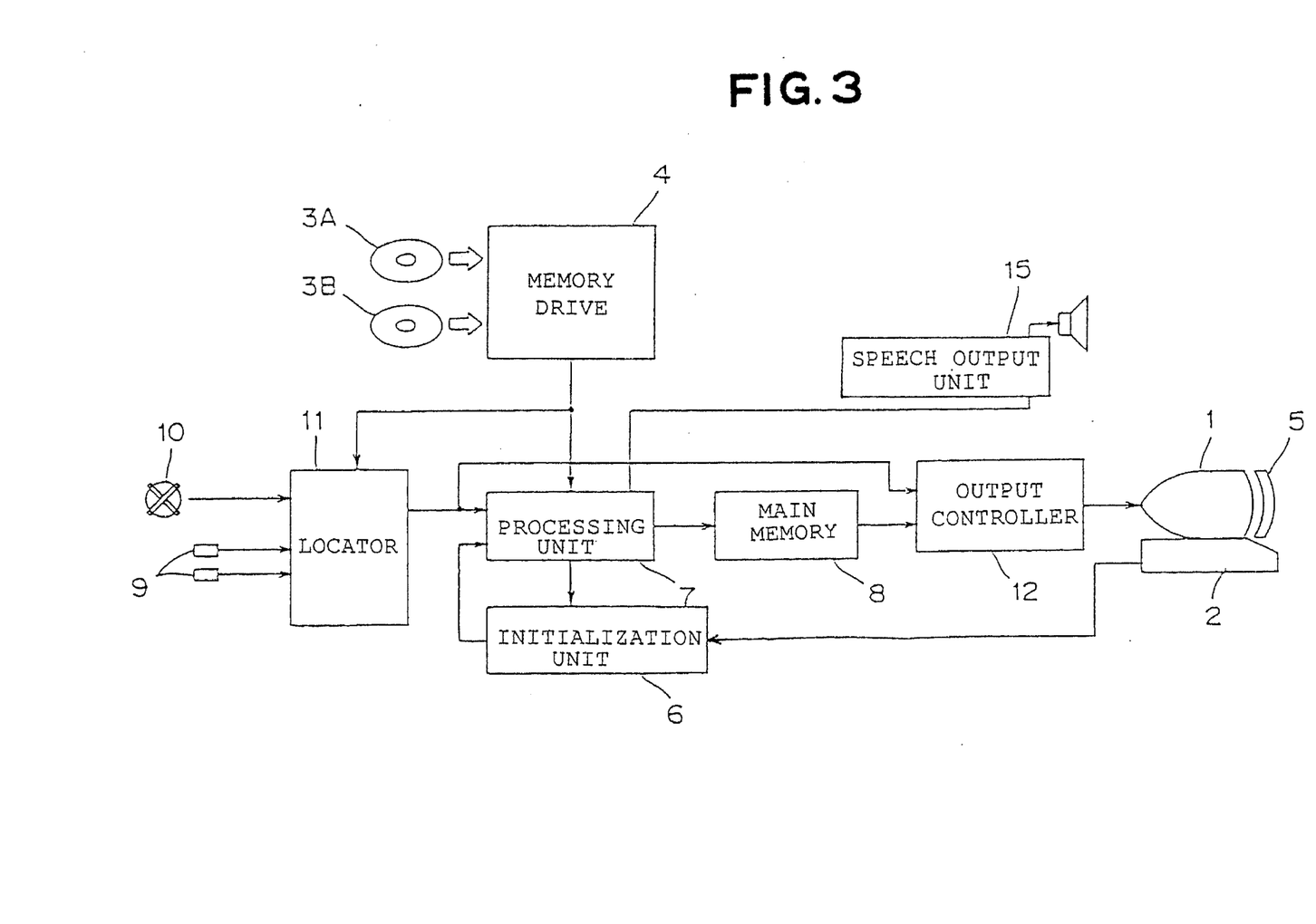
FIG. 3 is a block diagram illustrating a route guidance apparatus for implementing an optimum route determination of the present invention.

Referring to FIG. 3, there is shown a preferred embodiment of an optimum route determination apparatus in accordance with the present invention. The optimum route determination apparatus of the present invention is incorporated into a route guidance apparatus which displays an optimum route on the display and guides a vehicle with the aid of a speech output.

The route guidance apparatus, as shown in FIG. 3, comprises a display 1, a console 2, a heading sensor 10, a distance sensor 9, a road map memory 3A having road map data stored therein, a route memory 3B having a route table stored therein, a memory drive 4 for reading stored data out of the memories 3A and 3B, and a locator 11. The route guidance apparatus further comprises a processing unit 7 (this processing unit also functions initial route acquisition means) for searching an initial route, reading out a road map of a predetermined area, generating display data for guiding a vehicle, controlling a speech output unit 15 and for controlling the locator 11, a main memory 8 for storing the display data outputted from the processing unit 7, an output controller 12 for controlling the display 1, and an initialization unit 6 for setting initial data inputted from the console 2.

The above mentioned console 2 has a keyboard (not shown) which allows a vehicle operator to start and stop the route guidance apparatus, to move a cursor on the picture screen of the display 1, to enter initial data such as a destination and to scroll the road map displayed on the picture screen.

The heading sensor 10 is one which senses a change in the heading of the vehicle as it moves over streets. A magnetic sensor, a gyro or the like can be used as a heading sensor.

The distance sensor 9 is used to sense distances travelled by the vehicle. The distance sensor 9, for example, comprises a vehicle speed sensor which senses the speed of the vehicle, or one or more wheel sensors which sense the rotation of the wheels of the vehicle.

The locator 11 integrates the distance data sensed by the distance sensor 9 and the heading change data sensed by the heading sensor 10 to calculate travel track data, and detects a vehicle location by comparing the travel track data with road patterns stored in the road map memory 3A (road matching method). It is noted that a beacon receiver or GPS (Global Positioning System) receiver may be added in order to increase an accuracy in the location detection.

The display 1 has a touch panel 5 attached on the picture screen such as a CRT (Cathode Ray Tube) and crystalline panel.

The memories 3A and 3B are each constituted by mass storage medium memories such as CD-ROMs, IC memory cards and magnetic tapes.

Figure 5:
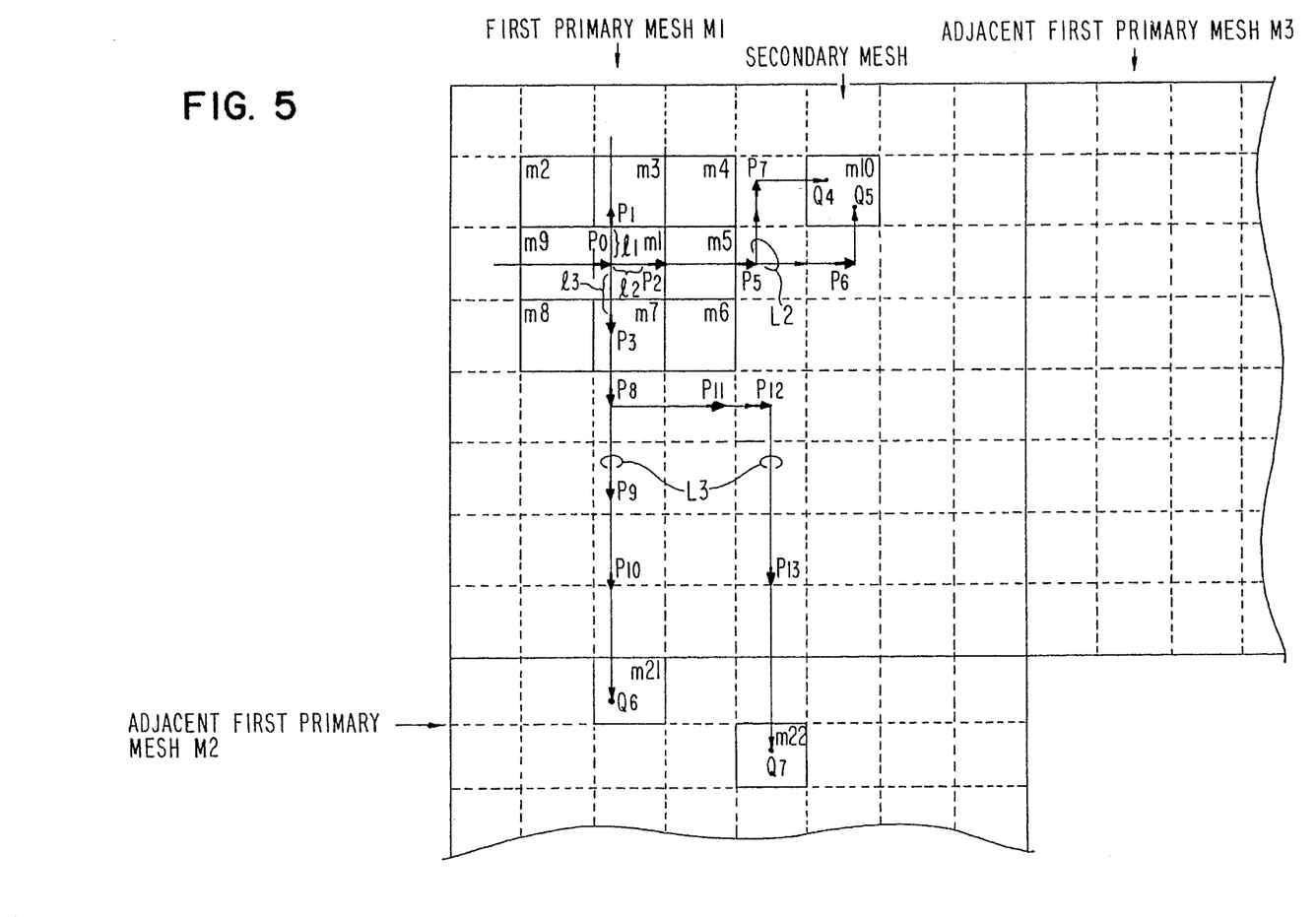
FIG. 5 illustrates a mesh map used to explain the structure of a route table that is used in a second embodiment of the present invention.

The road map memory 3A divides road map (containing freeways, arteries, streets, etc.) into meshes and stores therein combination data of nodes and links at the unit of each mesh. The road map memory 3A may also store therein background data such as railways, rivers, place-names, famous facilities, points prestored by a vehicle operator, contours and the like. The above mentioned meshes divide Japanese road map with a longitude difference of 1 degree and a latitude difference of 40 minutes, and comprise primary meshes each having longitudinal and lateral distances of about 80 km×80 km and secondary meshes each having longitudinal and lateral distances of about 10 km×10 km. As shown in FIG. 5, each primary mesh is constituted by 64 secondary meshes.

The node is referred to as a coordinate position for specifying a junction or turn of a road. In some cases, nodes representing junctions are called junction nodes and nodes representing turns of a road other than junctions are called interpolation point nodes. Data of a node contain a node number, addresses of nodes of surrounding blocks corresponding to that node and an address of a link connected to that node. Links are interconnected by nodes. Data of a link contain a link number, addresses of the start point and end point nodes of the link, a link distance, a link heading, time needed for travelling the link, road classification (freeways, arteries, streets, etc.), road width, and traffic restrictions such as one-way street and turn restriction.

Figure 2A:
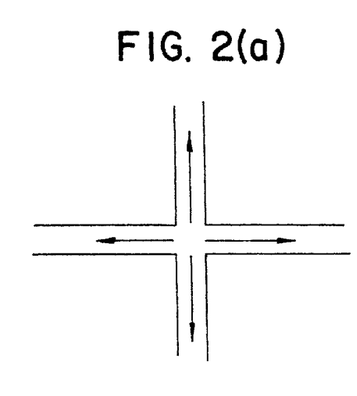
FIG. 2(a) illustrates leaving links by which a crossroads is specified.
Figure 2B:
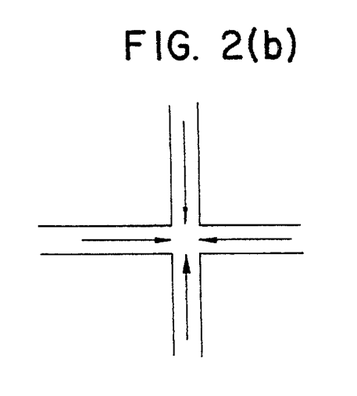
FIG. 2(b) illustrates approach links by which a crossroads is specified.

Thus, since the data of a link contain the addresses of the start point and end point nodes of the link, a point or position can be specified by only the data of a link. When a link start point is specified by a link, that link is referred to as "a leaving link". When, on the other hand, a link end point is specified by a link, that link is referred to as "an approach link". In addition, since the data of a link contain a link heading, the heading of a vehicle can also be specified by specifying a single link. FIG. 2(a) shows 4 leaving links by which a crossroads is specified, while FIG. 2(b) shows 4 approach links by which a crossroads is specified.

Figure 1:
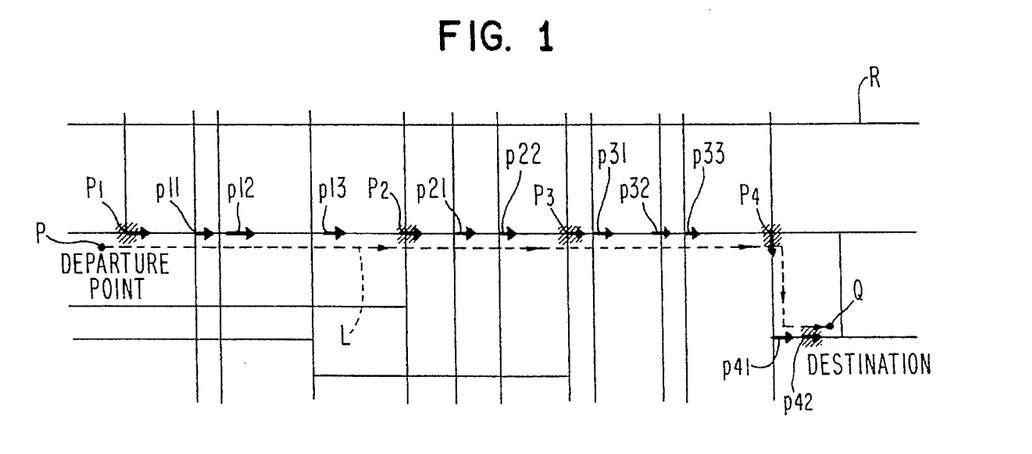
FIG. 1 illustrates a map used to explain how an optimum route determination apparatus of the present invention is operated.

In the embodiment of FIG. 1, the leaving links are used to specify a point or position.

From specific links respectively corresponding to a main intersection, leisure facility, station, parking area, on-ramp or off-ramp of a freeway, service area and beacon on a street, an optimum route leading to all links corresponding to a destination is calculated in advance (for example, before optimum route determination apparatuses are shipped from the factory) in accordance with route calculation conditions (shortest time route, shortest distance route, etc.). The calculated optimum route is constituted by a plurality of link rows each comprising an initial route leading from the above mentioned specific link to at least the next specific link. The link rows are stored in the route memory 3B in correspondence with the link corresponding to the destination and the specific links.

The operation of the optimum route determination apparatus will hereinafter be described in detail.

FIG. 1 shows a map used to explain how the optimum route determination apparatus is operated. The leaving links in the junctions of a networked road R are indicated by the arrows of FIG. 1. The leaving link denoted by a captital letter P (e.g., P1, P2, etc.) represents a specific link corresponding to a main intersection, and the leaving link denoted by a small letter p (e.g., p11, p12, etc.) represents a link corresponding to an intersection other than the main intersection.

Initialization will be performed as follows. If road map containing a departure point P entered by a vehicle operator is displayed, the vehicle operator scrolls the road map to search a destination Q, if necessary, and then touches a display position of the destination Q. The touched position is inputted to the intialization unit 6, in which a current position P of the vehicle outputted from the locator 11 is also stored. In obtaining an optimum route from the departure point P to the destination Q, the processing unit 7 sets a specific link nearest to the departure point P (in the embodiment of FIG. 1, P1) and also sets a link p42 corresponding to the destination Q, based on data from the initialization unit 6.

After the initialization has been performed as described above, the processing unit 7 returns the road map being displayed back to the road map containing the departure point P and retrieves the route memory 3B. In the route memory 3B, link rows each having an initial route starting from a specific link have been stored as a route table for the destination link p42. An example of the route table is shown in Table 1.

TABLE 1

| Destination Link p42 Departure Point Link | Link Row of Initial Route |
|---|---|
| P1 | P1, p11, p12, p13 |
| P2 | P2, p21, p22 |
| P3 | P3, p31, p32, p33 |
| P4 | P4, p41, p42 |

The processing unit 7 first reads a link row of P1, p11, p12 and p13 of an initial route corresponding to the departure point link P1 out of the route memory 3B through the memory drive 4. As a consequence, there can be obtained an initial route P1→p11→p12→p13 in which the departure point link P1 is a departure point. This initial route may be displayed immediately, or after an entire route has been obtained.

Next, by the time the vehicle reaches the specific link P2 (for example, signal waiting time of an intersection may be used, or time before departure may be used), the processing unit 7 reads a link row of P2, p21 and p22 of an initial route corresponding to the specific link P2 out of the route memory 3B. As a consequence, an initial route P2→p21→p22 in which the specific link P2 is a departure point. This route may also be displayed immediately, or after an entire route has been obtained. In the same way, an initial route P3→p31→p33 in which the specific link P3 is a departure point can be obtained and displayed. Finally, an initial route P4→p41→p42 in which the specific link P4 is a departure point can be obtained and displayed. In this way, all the route data from the departure point link P1 to the destination link p42 can be obtained and displayed.

In the above mentioned case, a route from the departure point P to the first specific point P1 cannot be displayed immediately to a vehicle operator because it is not stored in the above mentioned route table. However, since that route is normally a short distance and if route calculation is performed in a conventional manner, there will be no problem because an optimum route can be obtained within a relatively short period of time. Since the departure point P is very near to the first specific point P1, there is no possibility that the vehicle operator gets lost, and there are some cases where display of the specific link P1 alone is quite enough. In addition, in a case where a distance between a departure point and a destination is short, route calculation may be performed without storing the above mentioned initial routes in the route table. The reason is that, if the initial routes are stored when a distance between a departure point and a destination is short, the capacity of a memory will be increased. If a short distance, it will not take a long time to calculate and obtain an optimum route.

Figure 4:
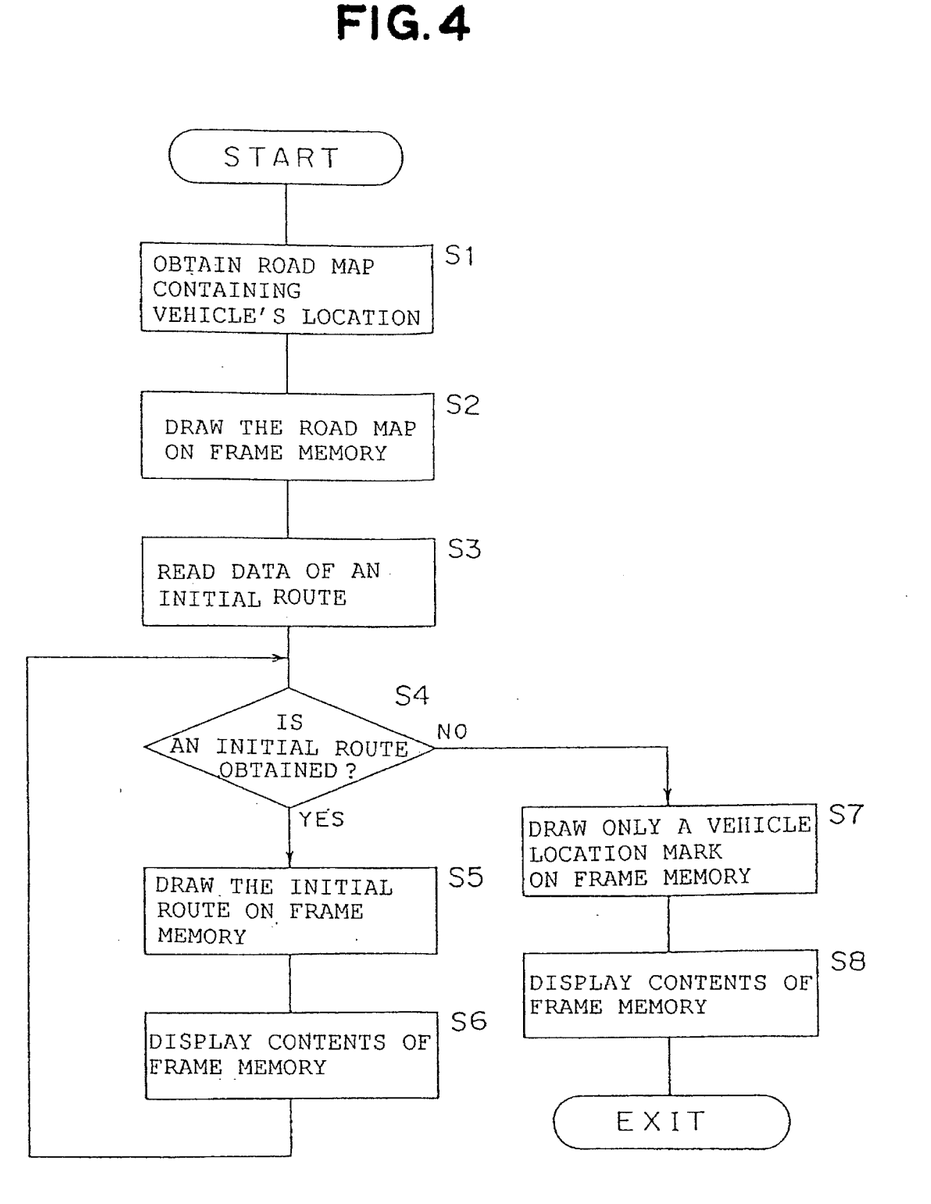
FIG. 4 is a flow chart illustrating how a vehicle is guided along an optimum route.

FIG. 4 illustrates how a vehicle is guided along an optimum route. In step S1, road map containing a vehicle's current location is obtained from the road map memory 3A, and in step S2 the road map is drawn on the frame memory in accordance with a predetermined magnification rate. Then, in step S3 the data of the above mentioned initial route is read out of the route memory 3B in the manner described above. In step S4, it is determined whether the initial route is obtained or not. When the initial route is not obtained (this occurs, as previously described, when a distance between a departure point and a destination is short and an initial route is not stored in the route table), the step S4 advances to step S7, in which only a current location mark of the vehicle is drawn on the frame memory. In step S8, the contents of the frame memory are displayed on the display 1. At this time, a route, which is obtained by performing an ordinary route calculation, may also be displayed. When in the step S4 the initial route is obtained, the step S4 advances to step S5, in which the initial route is drawn on the road map being displayed, with the aid of the above mentioned link row. Then, in step S6 the initial route is displayed along roads with the aid of heading vectors.

Figure 6:
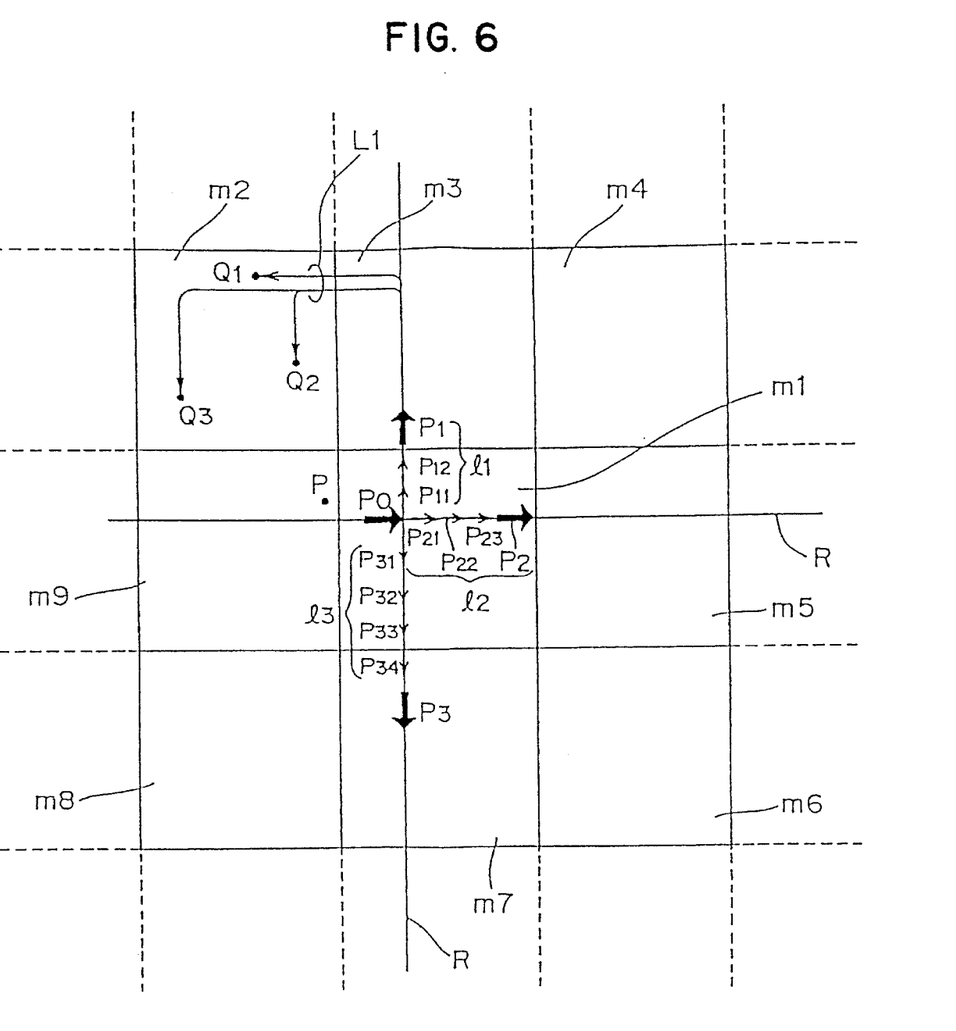
FIG. 6 is a part-enlarged diagram of the mesh map of FIG. 5.

FIGS. 5 and 6 illustrate a second embodiment of the present invention in which the approach links are used to specify a point or position.

From specific links respectively corresponding to a main intersection, leisure facility, station, parking area, on-ramp or off-ramp of a freeway, service area and beacon on a street, an optimum route leading to all links corresponding to a destination is calculated in advance (for example, before optimum route determination apparatuses are shipped from the factory) in accordance with route calculation conditions (shortest time route, shortest distance route, etc.). The calculated optimum route is constituted by a plurality of link rows each comprising an initial route leading from the above mentioned specific link to at least the next specific link. The link rows are stored in the route memory 3B in correspondence with the specific links and the mesh to which the destination belongs.

The structure of the route memory 3B of the second embodiment of the present invention will hereinafter be described in detail in conjunction with drawings and tables.

FIG. 5 illustrates a primary mesh M1, and primary meshes M2 and M3 adjacent to the mesh M1. The specific points along roads are defined by the approach links (e.g., P0, P1, P2, etc.) indicated by the bold arrows of FIG. 5. Assume now that a departure point link P0 (specific link nearest to a departure point) is in one secondary mesh m1 on the primary mesh M1. It is also assumed that the secondary meshes adjacent to the secondary mesh m1 are m2–m9, respectively, and the secondary mesh not adjacent to the secondary mesh m1 is, for example, m10. In addition, arbitrary secondary meshes on the primary mesh M2 adjacent to the primary, mesh M1 are assumed to be m21 and m22, respectively.

The secondary meshes m1–m9 are enlarged and shown in FIG. 6. In FIG. 6, a normal link other than the above mentioned specific link is indicated by a small letter p (e.g., p11, p12, etc.).

When, for example, destinations are in the adjacent secondary mesh m2, an optimum route L1 leading to each destination (only links Q1, Q2 and Q3 corresponding to three destinations are shown) is shown in FIG. 6. The optimum routes L1 for the destinations Q1, Q2 and Q3 each have the same departure point link P0 and the same initial route l1, which initial route l1 is continuous to the link P0 and consists of p11, p12 and P1. In that case, in the route table, the same initial routes l1 are respectively stored for different destinations Q1, Q2 and Q3.

Next, when, as shown in FIG. 5, destinations are in the same primary mesh M1 but they are in the secondary mesh not adjacent, for example, the secondary mesh m10, it is assumed that optimum routes L2 leading to each destination (only links Q4 and Q5 corresponding to two destinations are shown) each have the same departure point link P0 and the same initial route l2 consisting of p21, p22, p23 and P2 (FIG. 6). In that case, all the destination links such as Q4 and Q5 in the secondary mesh m10 are combined into one, and the initial route l2 is stored in correspondence with the secondary mesh m10.

When destinations are in another primary mesh, for example, the primary mesh M2 adjacent to the primary mesh M1 and when the optimum routes L3 leading to each destination (only links Q6 and Q7 corresponding to two destinations are shown) each have the same departure point link P0 and the same initial route l3 continuous to the link P0 and consisting of p31, p32, p33, p34 and P3, all the destination links in the adjacent primary mesh M2 are combined into one and the initial route l3 is stored in correspondence with the primary mesh M2.

The structure of the route table will hereinafter be described in detail. The route table has four kinds of blocks that are defined for each departure point link. The four kinds of blocks comprise a primary mesh block, a secondary mesh block, a link block and an initial route block. The number of the primary mesh blocks is one with respect to one departure point link. The secondary mesh blocks correspond in number to the primary meshes. The number of the link blocks is equal to the total number of a secondary mesh containing a departure point link and the secondary meshes surrounding that secondary mesh. The number of the initial route blocks is one, and data of all initial routes whose starting points are a departure point link are stored in the initial route block.

The primary mesh block has addresses to other blocks in correspondence with each primary mesh. For instance, if it is assumed that a departure point is P0, the primary mesh M1 to which that link P0 belongs has a relative address of the secondary mesh block corresponding to the primary mesh M1. In the case of the primary mesh M2 to which the departure point link P0 does not belong, it has a relative address of initial route data (which have been stored in the initial route block) corresponding to that primary mesh M2. An example of the primary mesh block is shown in Table 2.

TABLE 2

| | Primary Mesh Block (Departure Point Link P0) |
|---|---|
| Mesh Number | Relative Address of Secondary Mesh Block or Initial Route Block |
| M1 | Secondary Mesh Block Address: # m1 |

TABLE 2-continued

Primary Mesh Block
(Departure Point Link P0)

| Mesh Number | Relative Address of Secondary Mesh Block or Initial Route Block |
|---|---|
|  | # m2 |
|  | . . . |
|  | # m9 |
|  | # m10 |
| M2 | . . . |
|  | Initial Route Block Address: |
|  | # 13 |
| M3 | Initial Route Block Address: |
|  | # 12 |
| . . . | . . . |

The secondary mesh block also addresses to other blocks in correspondence with each secondary mesh. For instance, the secondary mesh m1 to which the departure point link P0 belongs and the secondary mesh m2–m9 surrounding the secondary mesh m1 correspond to relative addresses to link blocks corresponding to the secondary meshes m1–m9. The secondary mesh m10 not adjacent to the secondary mesh m1 corresponds to a relative address of an initial route corresponding to the secondary mesh m10. An example of the secondary mesh block is shown in Table 3.

TABLE 3

Secondary Mesh Block
(Departure Point Link P0, Primary Mesh M1)

| Mesh Number | Address of Link Block or Initial Route Block |
|---|---|
| m1 | Relative Address of Link Block: |
|  | # L1 |
| m2 | # L2 |
| . . . | . . . |
| M9 | # L9 |
| m10 | Initial Route Block Address: |
|  | # 12 |
| . . . | . . . |

The link block is set every secondary mesh, and in correspondence with each link in the secondary mesh to which the link block belongs, has a address of an initial route block leading a departure point link P0 to that each link. An example of the link block corresponding to the secondary mesh m2 is shown in Table 4.

TABLE 4

Link Block
(Departure Point Link P0, Primary Mesh M1, Secondary Mesh m2)

| Mesh Number | Address of Initial Route Block |
|---|---|
| Q1 | # 11 |
| Q2 | # 12 |
| Q3 | # 13 |
| . . . | . . . |

The initial route block stores therein data of all initial routes (e.g., 11, 12, 13, etc.) whose departure points are the departure point link P0. An example of the initial route block is shown in Table 5.

TABLE 5

Initial Route Block
(Departure Point Link P0)

| Address of Initial Route Data | Initial Route Data |
|---|---|
| # 11 | p11, p12, P1 |
| # 12 | p21, p22, p23, P2 |
| # 13 | p31, p32, p33, p34, P3 |
| . . . | . . . |

The operation of the optimum route determination of the second embodiment of the present invention will hereinafter be described in conjunction with FIGS. 5 and 6.

Initialization will be performed as follows. If road map containing a departure point P entered by a vehicle operator is displayed, the vehicle operator scrolls the road map to search a destination, if necessary, and then touches a display position of the destination. The touched position is inputted to the intialization unit 6, in which a current position P of the vehicle outputted from the locator 11 is also stored. In obtaining an optimum route from the departure point P to the destination, the processing unit 7 sets a specific link nearest to the departure point P (in the second embodiment, P0) and also sets a destination link corresponding to the destination, based on data from the initialization unit 6.

After the initialization has been performed as described above, the processing unit 7 returns the road map being displayed back to the road map containing the departure point P and retrieves the route tables of the route memory 3B.

In a case where a destination link is in other primary meshes, for example, the primary mesh M2, the processing unit 7 first reads an address #13 of an initial route block corresponding to the mesh number M2 out of the primary mesh block of the route memory 3B through the memory drive 4 (Table 2). Next, data p31, p32, p33, p34 and P3 corresponding to the address #13 are accessed out of the initial route block (Table 5). As a consequence, a route p31→p32→p33→p34 in which the start point thereof is the departure point link P0 can be specified as an initial route. This initial route will be displayed on the display 1, as will be described later.

In a case where a destination link is within the same primary mesh and within a secondary mesh not surrounding the secondary mesh containing the departure point P0, for example, m10, the processing unit 7 reads the mesh number M1 and the secondary mesh block #m10 out of the primary mesh block of the route memory 3B (Table 2). Based on the secondary mesh block #m10, an address #12 of an initial route block corresponding to the mesh number m10 is then obtained (Table 3). Based on that initial route block, data p21, p22, p23 and P2 corresponding to the address #12 are acquired (Table 5).

In a case where a destination link is within the same primary mesh and within the same secondary mesh or surrounding secondary mesh, for example, m2, the processing unit 7 reads the mesh number M1 and the secondary mesh block #m2 out of the primary mesh block of the route memory 3B (Table 2). Based on the secondary mesh block #m2, a link block corresponding to the mesh number m2 is then accessed. Based on that link block, a destination link, for example, Q2 is accessed, and an address #11 of an initial route block is obtained (Table 4). Further, the initial route block is accessed and data p11, p12 and P1 corresponding to the initial route block is acquired (Table 5).

In the manner described above, for any destination, the route tables are retrieved and initial route data can be acquired.

As shown in Table 3, with respect to a slightly far destination that is within the same primary mesh and within a secondary mesh not surrounding the secondary mesh containing a departure point, one initial route is stored every secondary mesh. Also, with respect to a far destination that is located in a different primary mesh, one initial route is stored every primary mesh, as shown in Table 2. As a consequence, the capacity of a memory can be greatly saved.

However, with respect to short destinations that are within the same primary mesh and within the same or surrounding secondary mesh, the same addresses #11 of an initial route block are respectively stored for destinations Q1, Q2 and Q3, as will be understood from Table 3. The reason is that an amount of data to be stored is not large, because the area of the same or surrounding secondary mesh is limited. However, it is possible to combine into one information as in the case of far destinations, if initial routes can be combined together with respect these short destinations.

In the embodiment described above, the question is whether all destination links within other primary meshes or all destination links within other secondary meshes not surrounding always have the same initial route. However, even in the case of not having the same initial route, an initial route that most of destination links have in common has been reckoned as an initial route corresponding to all destination links within those meshes. If the principle of majority decision such as this is accepted, there will be some cases where the reckoned initial route is not a part of an optimum route for some destinations. However, since, as shown in FIG. 5, each destination is located toward the same direction as that of the departure point, the initial route decided by the above mentioned majority decision will not be departed greatly from the optimum route. Therefore, there is no problem for practical use.

It is noted that, in addition to the majority decision, a representative point within a mesh is set and an initial route having that point may also be reckoned as an initial route corresponding to that mesh. In addition, instead of determining an initial route uniformly, it is also possible that a vehicle operator selects one from among a plurality of initial routes.

As previously described, in accordance with the present invention, an optimum route leading from each of the above mentioned specific links to each destination link has been calculated in advance, and only initial routes, each of which is a part of the calculated optimum route, have been stored in the route table of the route memory 3B constituted by a mass storage medium memory such as a CD-ROM, IC memory card and magnetic tape. Therefore, if a destination is inputted by a vehicle operator, an initial route leading to that destination can be displayed immediately with the aid of the route table. By the time that the vehicle travels the initial route, the following initial route is displayed. Finally, the optimum route leading to the destination can be displayed. Further, with respect to destinations that have the same initial route, one initial route has been stored in accordance with the present invention. As a consequence, the capacity of a memory for storing initial routes can be greatly saved.

Figure 7:
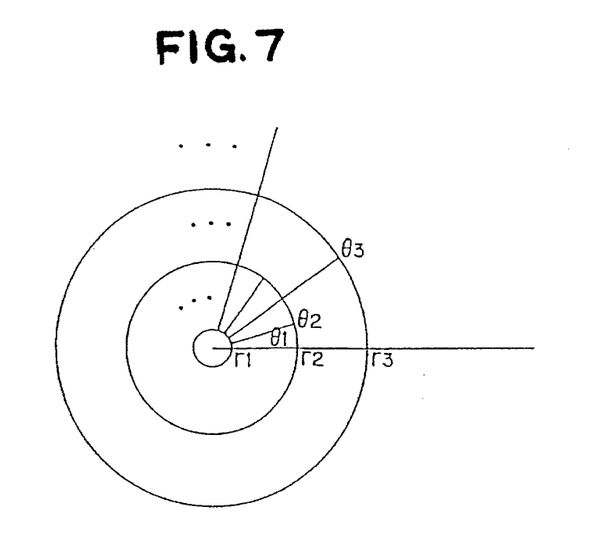
FIG. 7 illustrates a map divided with polar coordinates instead of meshes.
Figure 8:
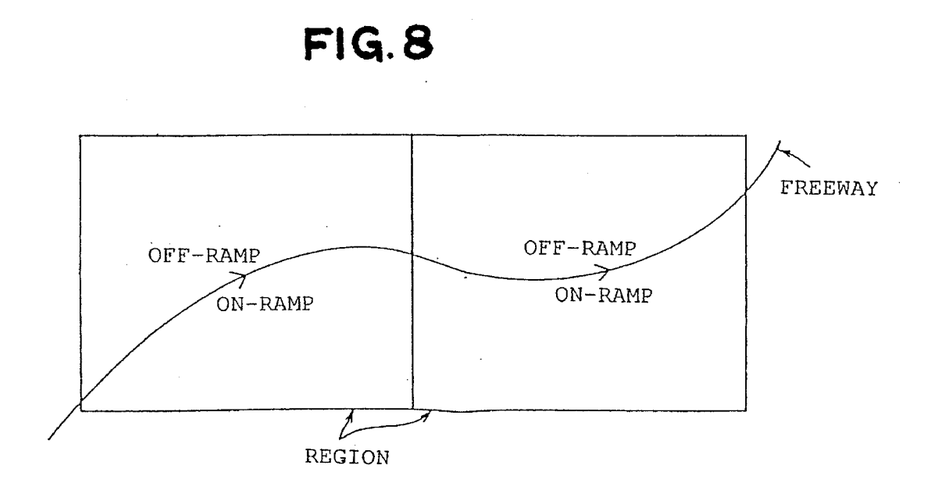
FIG. 8 illustrates areas adjacent to a freeway that can be used to express destinations having the same initial route.

Although, in the above mentioned embodiments, mesh structure has been used to express destinations having the same initial route, it is also possible to use a straight distance r and a heading $\Theta$ from a specific point that is a departure point, as shown in FIG. 7. In the case of $r \leq r1$, initial routes are not combined into one. In the case of $r1 < r \leq r2$, an area between r1 and r2 is divided every a predetermined angle $\Theta1$. In the case of $r2 < r \leq r3$, an area between r2 and r3 is divided every a predetermined angle $\Theta2$ greater than $\Theta1$. In the case of $r3 > r$, it is also possible to divide every a further greater angle $\Theta3$. Furthermore, in a case where a route leading to a destination includes a freeway, areas adjacent to the off-ramp of the freeway can be used to express destinations having the same initial route, as shown in FIG. 8. In that case, areas having the same off-ramp are combined into one by actually calculating routes.

In addition, although in the embodiments the links have been used to specify a point or position, it is noted that nodes may also be used. In addition, although it has been described that the road map data are constituted by links or nodes for specifying all roads, it is noted that the data may also be constituted by link and node data of main arteries, if the memory capacity is not enough because of a great number of links and nodes.

While the subjection invention has been described with relation to the preferred embodiments, various modifications and adaptations thereof will now be apparent to those skilled in the art. All such modifications and adaptations as fall within the scope of the appended claims are intended to be covered thereby.

What we claim is:

1. In an optimum route determination apparatus which, according to a destination set by a vehicle operator, reads road map data of an area containing a departure point and that destination out of a road map memory for a road map and which determined an optimum route leading from the departure point to the destination based on the road map data, selection means exterior to said optimum route determination apparatus having previously selected a plurality of specific points, calculation means exterior to said optimum route determination apparatus having previously calculated a plurality of optimum routes which lead from said plurality of specific points to a plurality of destinations, respectively, passing in sequence through specific points and each specific point representing at least one departure point in a respective optimum route, said optimum route determination apparatus comprising:

a route memory having stored therein a route table containing data of said specific points, data of said destinations and data of a plurality of initial routes, one of said initial routes leading from one of said specific points to at least the next specific point in said sequence positioned on one of said optimum routes leading from said one of said specific points to one of said destinations, and not including all specific points comprising the optimum route to a respective destination, wherein said data of said data of said specific points, said data of said destinations and said data of said initial routes are contained in said route table in such a manner that the data of said one of said initial routes is acquired by searching said route table for said one of said specific points and one of said destinations;

initialization means for setting one of said destinations and one of said specific points near to a current location of a vehicle; and initial route acquisition means for searching said route table for the specific point and the destination set by said initialization means to acquire said data of said initial route, said initialization means then replacing said one of said specific points with the next specific point, said initial route acquisition means and said initialization means then repeating the searching and replacing operations until one of said optimum routes is constituted by the repeatedly acquired initial route data.

2. In an optimum route determination apparatus which, according to a destination set by a vehicle operator, reads road map data of an area containing a departure point and that destination out of a road map memory and which determines an optimum route leading from the departure point to the destination based on the road map data, selection means exterior to said optimum route determination apparatus having previously selected a plurality of specific points, calculation means exterior to said optimum route determination apparatus having previously calculated a plurality of optimum routes which lead from a plurality of departure points to said plurality of specific points, respectively, passing in sequence through the departure points and specific points, each specific point representing at least one destination point in a respective optimum route, said optimum route determination apparatus comprising:

a route memory having stored therein a route table containing data of said departure points, data of said specific points and data of a plurality of end routes, each end route not including all specific points comprising the optimum route from the departure point to a specific point representing a respective destination, one of said end routes leading to said one of said specific points from at least a first specific point positioned closer to the departure point than said one of said specific points, wherein one of said optimum routes leading from one of said departure points to said one of said specific points passes through said first specific point, and said data of said departure points, said data of said specific points and said data of said end routes are contained in said route table in such a manner that the data of said one of said end routes is acquired by searching said route table for said one of said departure points and said one of said specific points;

initialization means for setting one of said departure points and one of said specific points near to a destination of a trip;

end route acquisition means for searching said route table for the departure point and the specific point set by said initialization means to acquire said data of said end route, said initialization means then replacing said one of said specific points with said first specific point, said end route acquisition means and said initialization means then repeating the searching and replacing operations until one of said optimum routes are constituted by the repeatedly acquired end route data.

3. An optimum route determination apparatus as set forth in claim 2, wherein said road map data comprise combination of nodes and links, and points on said road map are specified by said links.

4. An optimum route determination apparatus as set forth in claim 2, wherein said road map data comprise combination of nodes and links, and points on said road map are specified by said nodes.

5. An optimum route determination apparatus as set forth in claim 2, wherein said route table of said route memory has stored therein data of said end route, when a distance between said departure point and said destination is longer than a predetermined distance.

6. In an optimum route determination apparatus which, according to a destination set by a vehicle operator, reads road map data of an area containing a departure point and that destination out of a road map memory for a road map and which determines an optimum route leading from the departure point, to the destination based on the road map data, selection means exterior to said optimum route determination apparatus having previously selected a plurality of specific points, calculation means exterior to said optimum route determination apparatus having previously calculated a plurality of optimum routes which lead from said plurality of specific points to a plurality of destinations, respectively, and said specific points being departure points, said optimum route determination apparatus comprising:

a route memory having stored therein a route table containing data of said specific points, data of said destinations and data of a plurality of initial routes, one of said initial routes leading from one of said specific points to at least a next specific point which is positioned on one of said optimum routes leading from said one of said specific points to one of said destinations, each specific point representing at least one departure point in a respective optimum route, wherein said data of said specific points, said data of said destinations and said data of said initial routes are contained in said route table in such a manner that the data of said one of said initial routes is acquired by searching said route table for said one of said specific points and said one of said destinations; each initial route not including all specific points comprising the optimum route to a respective destination;

initialization means for setting one of said destinations and one of said specific points near to a current location of a vehicle; and initial route acquisition means for searching said route table for the specific point and the destination set by said initialization means to acquire said data of said initial route, said initialization means then replacing said one of said specific points with the next specific point, said initial route acquisition means and said initialization means then repeating the searching and replacing operations until one of said optimum routes is constituted by the repeatedly acquired initial route data, wherein when the same initial route is stored with respect to different destinations, said route table of said route memory having stored therein said same initial route in correspondence with an aggregation of said different destinations.

7. An optimum route determination apparatus as set forth in claim 6, wherein said road map data comprise combination of nodes and links, and points on said road map are specified by said links.

8. An optimum route determination apparatus as set forth in claim 6, wherein said road map data comprise combination of nodes and links, and points on said road map are specified by said nodes.

9. An optimum route determination apparatus as set forth in claim 6, wherein said route table of said route memory has stored therein data of said initial route, when a distance between said departure point and said destination is longer than a predetermined distance.

10. In an optimum route determination apparatus which, according to a destination set by a vehicle operator, reads map data of an area containing a departure point and that destination out of a road map memory and which determines an optimum route leading from the departure point to the destination based on the road map data, selection means exterior to said optimum route determination apparatus having previously selected a plurality of specific points, calculation means exterior to said optimum route determination apparatus having previously calculated a plurality of optimum routes which lead from a plurality of departure points to said plurality of specific points, respectively, passing in sequence through the departure points and specific points, each specific point representing at least one destination point in a respective optimum route and said specific points being destinations, said optimum route determination apparatus comprising:

- a route memory having stored therein a route table containing data of said departure points, data of said specific points and data of a plurality of end routes, each end route not including all specific points comprising the optimum route from the departure point to a specific point representing a respective destination, one of said end routes leading to said one of said specific points from at least a first specific point positioned closer to the departure point than said one of said specific points, wherein one of said optimum routes leading from one of said departure points to said one of said specific points passes through said first specific point, and said data of said departure points, said data of said specific points and said data of said end routes are contained in said route table in such a manner that said data of said end route is acquired by searching said route table for said one of said departure points and said one of said specific points;
- initialization means for setting one of said departure points and one of said specific points near to a destination of a trip; and
- end route acquisition means for searching said route table for the departure point and the specific point set by said initialization means to acquire said data of said end route,
- said initialization means then replacing said one of said specific points with said first specific point, said end route acquisition means and said initialization means then repeating the searching and replacing operations until one of said optimum routes is constituted by the repeatedly acquired end route data,
- wherein when the same end route is stored with respect to different departure points, said route table of said route memory having stored therein said same end route in correspondence with an aggregation of said different departure points.

11. An optimum route determination apparatus as set forth in claim 10, wherein said road map data comprise combination of nodes and links, and points on said road map are specified by said links.

12. An optimum route determination apparatus as set forth in claim 10, wherein said road map data comprise combination of nodes and links, and points on said road map are specified by said nodes.

13. An optimum route determination apparatus as set forth in claim 10, wherein said route table of said route memory has stored therein data of said end route, when a distance between said departure point and said destination is longer than a predetermined distance.

* * * * *